United States Patent
Wang et al.

(10) Patent No.: US 9,985,563 B2
(45) Date of Patent: May 29, 2018

(54) METHOD AND SYSTEM FOR CONTROLLING ANGULAR SPEEDS OF MOTORS IN SPEED SENSORLESS INDUCTION MOTORS

(71) Applicant: Mitsubishi Electric Research Laboratories, Inc., Cambridge, MA (US)

(72) Inventors: Yebin Wang, Acton, MA (US); Scott A Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 194 days.

(21) Appl. No.: 14/992,113

(22) Filed: Jan. 11, 2016

(65) Prior Publication Data

US 2017/0201198 A1    Jul. 13, 2017

(51) Int. Cl.
*H02P 21/14* (2016.01)
*H02P 21/00* (2016.01)

(52) U.S. Cl.
CPC .......... *H02P 21/14* (2013.01); *H02P 21/0039* (2013.01)

(58) Field of Classification Search
CPC .............................. H02P 21/14; H02P 21/0039
USPC .......................................................... 318/799
See application file for complete search history.

(56) References Cited

U.S. PATENT DOCUMENTS 5,296,793 A *  3/1994  Lang ............................. 318/800
6,518,722 B1 *  2/2003  Giuseppe ...................... 318/727
6,940,253 B2 *  9/2005  Hinkkanen ................... 318/804
8,618,756 B2   12/2013  Hung et al.
8,674,647 B2   3/2014   Iwaji et al.
8,760,098 B2   6/2014   Qin

OTHER PUBLICATIONS

C. Schauder, "Adaptive speed identification for vector control of induction motors without rotational transducers," IEEE Transactions on Industry Applications, vol. 28, No. 5, pp. 1054-1061, Sep./Oct. 1992.

H. Kubota, K. Matsuse, and T. Nakano, "DSP-based speed adaptive flux observer of induction motor," IEEE Transactions on Industry Applications, vol. 29, No. 2, pp. 344-348, Mar./Apr. 1993.

H. Kubota and K. Matsuse, "Speed sensorless field-oriented control of induction motor with rotor resistance adaption," IEEE Transactions on Industry Applications, vol. 30, No. 5, pp. 1219-1224, Sep./Oct. 1994.

K. Ohyama, G. M. Asher, and M. Sumner, "Comparative analysis of experimental performance and stability of sensorless induction motor drives," IEEE Transactions on Industrial Electronics, vol. 53, No. 1, pp. 178-186, Feb. 2006.

(Continued)

*Primary Examiner* — Kawing Chan
(74) *Attorney, Agent, or Firm* — Gene Vinokur; James McAleenan; Hironori Tsukamoto

(57) ABSTRACT

Angular speed of a rotor of an induction motor without an encoder for rotor position and speed sensing is controlled by first sensing stator currents and voltages of the induction motor. A dynamic gain estimator is designed by applying a state transformation to a model of the induction motor. A states of the induction motor is estimated by applying the dynamic gain estimator to the currents and the voltages, and then the state is used to control the angular speed of the rotor of the induction motor.

16 Claims, 14 Drawing Sheets

(56) References Cited

OTHER PUBLICATIONS

D. J. Atkinson, P. P. Acarnley, and J. W. Finch, "Observers for induction motor state and parameter estimation," IEEE Transactions on Industry Applications, vol. 27, No. 6, pp. 1119-1127, Nov./Dec. 1991.

M. Hilairet, F. Auger, and E. Berthelot, "Speed and rotor flux estimation of induction machines using a two-stage extended kalman filter," Automatica, vol. 45, No. 8, pp. 1819-1827, Aug. 2009.

* cited by examiner

METHOD AND SYSTEM FOR CONTROLLING ANGULAR SPEEDS OF MOTORS IN SPEED SENSORLESS INDUCTION MOTORS

FIELD OF THE INVENTION

This invention relates generally to controlling electric motors, and more particularly to a method and system for controlling the angular speed of a rotor of in a speed sensorless induction motor.

BACKGROUND OF THE INVENTION

Adjustable speed induction motors are widely used due to low maintenance cost and acceptable performance. The speed control design, or equivalently, the motor drive design, of the induction motor is challenging due to highly nonlinear dynamics. Among various means, the vector (field oriented) control appears to be a good and most popular solution that has evolved as a mature technology.

This invention considers speed sensorless control technologies for the induction motor, i.e., an inductor motor where the rotor speed or position is not measured by encoders. Speed sensorless motor drives (motor drives) are desirable due to the elimination of speed sensors, lower cost, and improved reliability of the resultant system. Current speed sensorless motor drives suffer significant performance degradation due to the absence of the encoder to sense the rotor position and speed. Thus, their applications remain limited to fields requiring low or medium performance.

The performance of speed sensorless motor drives relies heavily on the performance of a flux and speed estimator 106-107 described below with reference to FIGS. 1A and 1B. A number of prior arts methods contribute to the developments of speed sensorless control technologies. The flux and speed estimator design methods include: a voltage model based direct integration approach, an adaptive observer approach, an extended kalman filter approach, see Schauder, "Adaptive speed identification for vector control of induction motors without rotational transducers," IEEE Transactions on Industry Applications, vol. 28, no. 5, pp. 1054-1061, September/October 1992, H. Kubota, K. Matsuse, and T. Nakano, "DSP-based speed adaptive flux observer of induction motor," IEEE Transactions on Industry Applications, vol. 29, no. 2, pp. 344-348, March/April 1993, H. Kubota and K. Matsuse, "Speed sensorless field-oriented control of induction motor with rotor resistance adaption," IEEE Transactions on Industry Applications, vol. 30, no. 5, pp. 1219-1224, September/October 1994, K. Ohyama, G. M. Asher, and M. Sumner, "Comparative analysis of experimental performance and stability of sensorless induction motor drives," IEEE Transactions on Industrial Electronics, vol. 53, no. 1, pp. 178-186, February 2006, D. J. Atkinson, P. P. Acamley, and J. W. Finch, "Observers for induction motor state and parameter estimation," IEEE Transactions on Industry Applications, vol. 27, no. 6, pp. 1119-1127, November/December 1991, and M. Hilairet, F. Auger, and E. Berthelot, "Speed and rotor flux estimation of induction machines using a two-stage extended kalman filter," Automatica, vol. 45, no. 8, pp. 1819-1827, August 2009.

FIGS. 1A and 1B show a conventional speed sensorless motor 105 and controller. An input signal 111 is a reference rotor flux amplitude, a signal 112 is an estimate outputted from a flux estimator block 106. A signal 113 represents a difference between signals 111 and 112.

A flux control block 101 determines a stator current in the d-axis, denoted by signal 114. A signal 115, as an estimate or true stator current in the d-axis, is produced by the flux estimator 106.

A difference signal 116 between signals 115 and 114 is used by a current control block 103 to determine a reference stator voltage in the d-axis, which is part of signal 123. Similarly, a signal 117 denotes a desired rotor speed reference for the induction motor. A signal 118 denotes an estimated rotor speed produced by a speed estimator block 107 based on an output signal 126 of the flux estimator 106.

A difference signal 119 between signals 117 and 118 is input to the speed control block 102 to determine a reference stator current 120 in the q-axis. An estimated or true stator current 121 in the q-axis is compared to the reference stator current 120 in the q-axis to produce a difference signal 122. The current control block 103 determines a desired stator voltage signal 123 in d- and q-axis, on the basis of the difference signals 116 and 122.

An inverse Clarke/Park transformation 104 convert the desired stator voltages signals in d- and q-axis into desired well-known three-phase voltages, and produces three-phase voltages, denoted as by 124, to drive the induction motor 105.

Note that the flux estimator 106 takes the three-phase voltages 124, sensed 131 phase currents 125, see FIG. 1B, as input signals and outputs estimated or true stator currents 115 and 121, estimated rotor flux amplitude 112, and estimated rotor speed signal 118 to produce the difference signals 113, 116, 119, and 122. The signal 119 is used by the speed control block 102.

FIGS. 2A and 2B show prior art estimator methods based on stator currents and voltages 211, which are measured by sensors 202 and are assumed in balanced three-phases and in orthogonal stationary frame, and an induction motor model 201. A Clarke/Park transformation 203 is applied to transform the induction motor model 201 and the sensed signals 211 so that quantities (including variables in the induction motor model and measured signals) in balanced three-phases are converted into quantities in balanced two-phases.

All these estimation methods fit an architecture shown in FIGS. 2A and 2B. As shown in FIG. 2A-2B, the estimator methods are based on stator currents and voltages signals, denoted by 211, measured by a sensing block 202 and an induction model 201. A Park Transformation block 203 may or may not be used to transform the induction motor model 201 and the sensed signals 211. A block 204 represents an estimator to produce estimates of stator currents, rotor flux, and rotor speed signals. The voltage model based direct integration suffers accumulation error due to inaccurate measurement. Adaptive observer and extended kalman filter approaches yield slow speed tracking performance because the speed is treated as an unknown parameter and its identification is slow.

This fact is elaborated by FIG. 2B, where block 222 represents the unnecessary assumption that the rotor speed is a parameter, and a speed estimator 223 produces the rotor speed estimate based on outputs of block 221, and the assumption 222.

Overall, most of existing speed sensorless motor drives produce limited speed tracking performance due to performing estimator design in appropriate state coordinates and under unnecessary assumption. Also, most speed-sensorless estimation methods are ad-hoc and the resultant estimation error dynamics are not guaranteed to be stable.

SUMMARY OF THE INVENTION

The embodiments of the invention provide a method and system for controlling rotor angular speed of an induction motor. The invention focuses on estimation methods that guarantee stability and practical effectiveness. The main contributions of the invention are as follows.

The invention uses an induction motor model that admits a non-triangular observable form by changing state coordinates. Then, high gain observer design can be performed in new coordinates.

However, the high gain observer in the new coordinates is not implementable due to failure to establish a closed form expression of an inverse state transformation. Therefore, the embodiments use several observers, which can be implemented in the original coordinates.

The implementable observers in the original coordinates involve a matrix inversion, which can be subject to numerical stabilities from time to time. Consequentially, the invention uses several techniques to address this issue, and makes the high gain observer practical.

DETAILED DESCRIPTION OF THE PREFERRED EMBODIMENTS

Figure 1A:
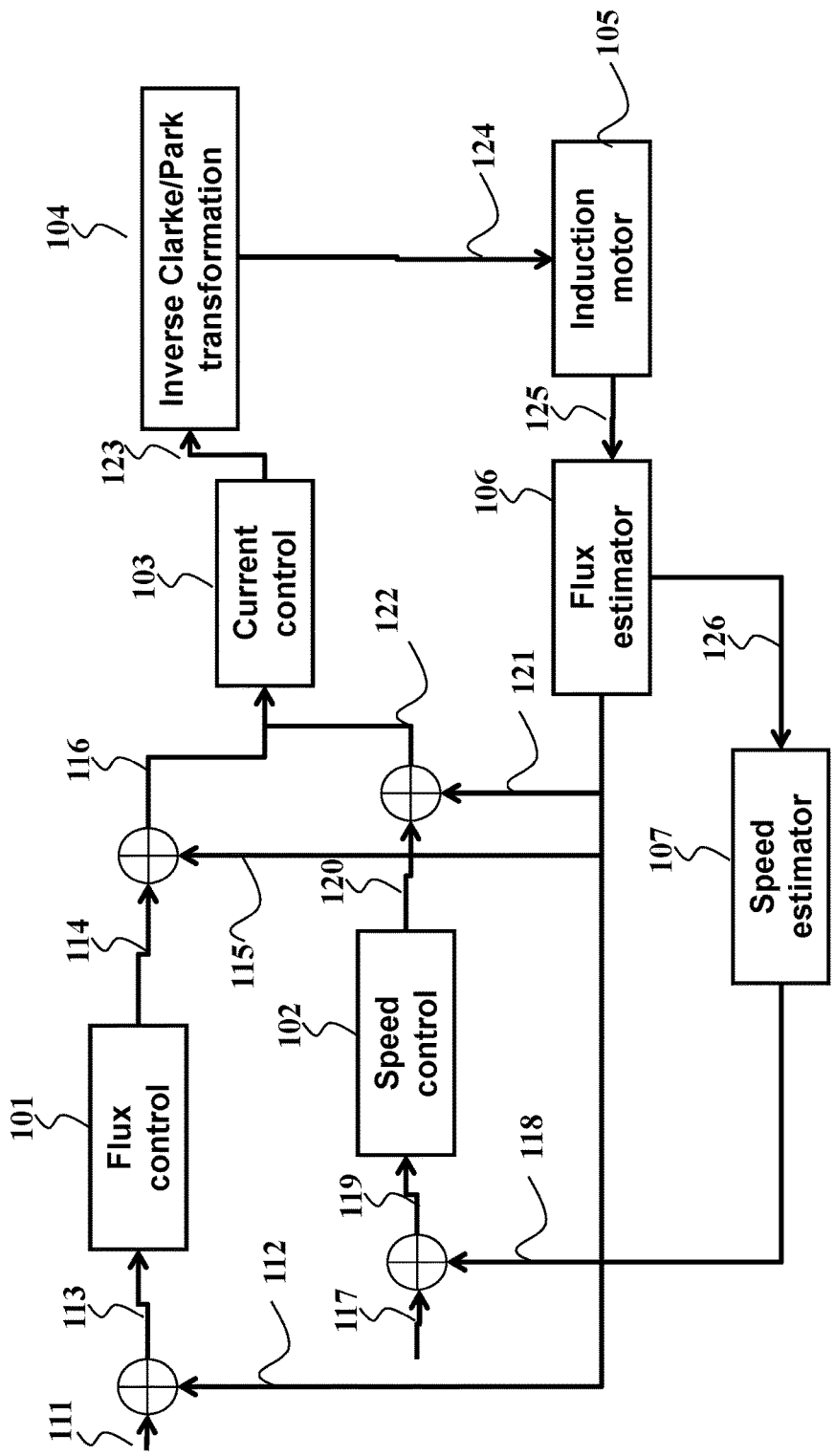
FIGS. 1A and 1B are block diagrams of a prior art sensorless speed motor drive.
Figure 1B:
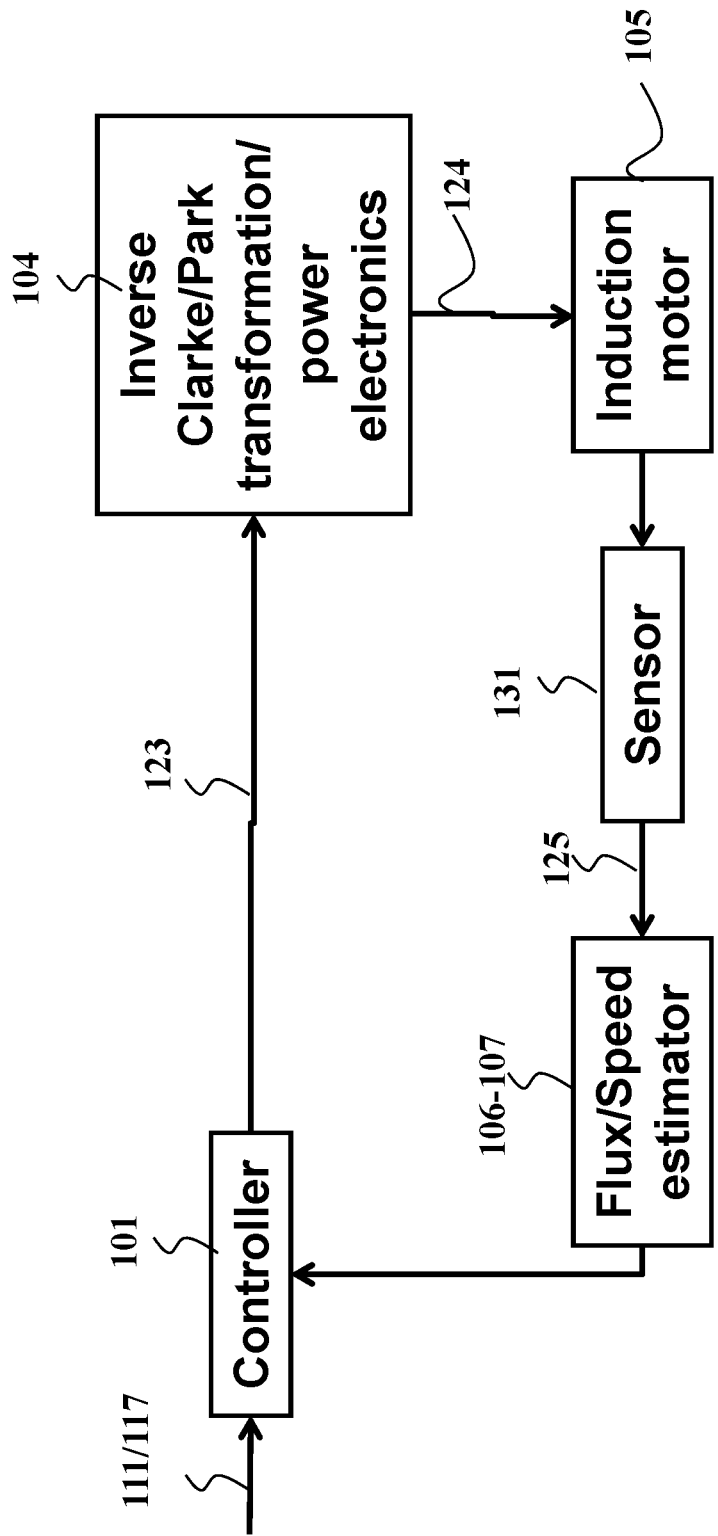

The embodiments of our invention provide a method and system for controlling rotor angular speed of an induction motor.

We define the following notations. For a variable $\zeta$ of the induction motor, we denote $\bar{\zeta}$ as the measured variable, $\hat{\zeta}$ as the estimate of the variable, $\zeta^*$ as the reference of the variable, $\tilde{\zeta}=\hat{\zeta}-\zeta$ as the estimation error, and $e_\zeta=\zeta^*-\zeta$ as a tracking error.

| Notation | Description |
|---|---|
| Notations | |
| $i_{ds}, i_{qs}$ | stator currents in d- and q-axis |
| $\Phi_{dr}, \Phi_{qr}$ | rotor fluxes in d- and q-axis |
| $\omega$ | rotor angular speed |

| Notation | Description |
|---|---|
| Notations | |
| $u_{ds}, u_{qs}$ | stator voltages in d- and q-axis |
| $\omega_1$ | angular speed of a rotating frame |
| $\Phi_{dr}^*$ | rotor flux amplitude reference |
| $\omega^*$ | rotor angular speed reference |
| $i_{ds}^*, i_{qs}^*$ | references of stator currents in d- and q-axis |
| $T_l$ | load torque |
| $J$ | inertia |
| $L_s, L_m, L_r$ | stator, mutual, and rotor inductances |
| $R_s, R_r$ | stator and rotor resistances |
| $\sigma$ | $\dfrac{L_s L_r - L_m^2}{L_r}$ |
| $\alpha$ | $R_r/L_r$ |
| $\beta$ | $L_m/(\sigma L_r)$ |
| $\gamma$ | $R_s/\sigma + \alpha\beta L_m$ |
| $\mu$ | $3L_m/(2JL_r)$ |

Clarke/Park Transformation

The Clarke transformation ($\alpha$-$\beta$ transformation), transforms quantities in three-phase circuits to a space vector representation, and thus simplifies the analysis of the three-phase circuits. In this disclosure, the Clarke transformation is limited to the case that transforms quantities in three-phase circuits such as three-phase stator voltages into a space vector in a fixed frame.

Similarly, the Park transformation (d–q transformation), projects quantities in the fixed frame onto a rotating two-axis reference frame. The Clarke/Park transformation and its inverse are well-known for those skilled in the art. Generally, applying the optional Park transformation after the Clarke transformation facilitates the control design.

Induction Motor Models

With the Clarke/Park transformation, a general model of the induction motor is $$\dot{i}_{ds} = -\gamma i_{ds} + \omega_1 i_{qs} + \beta(\alpha\Phi_{dr} + \omega\Phi_{qr}) + \frac{u_{ds}}{\sigma} \quad (1)$$

$$\dot{i}_{qs} = -\gamma i_{qs} + \omega_1 i_{ds} + \beta(\alpha\Phi_{qr} + \omega\Phi_{dr}) + \frac{u_{qs}}{\sigma}$$

$$\dot{\Phi}_{dr} = -\alpha\Phi_{dr} + (\omega_1 - \omega)\Phi_{qr} + \alpha L_m i_{ds},$$

$$\dot{\Phi}_{qr} = -\alpha\Phi_{qr} - (\omega_1 - \omega)\Phi_{dr} + \alpha L_m i_{qs},$$

$$\dot{\omega} = \mu(\Phi_{dr} i_{qs} - \Phi_{qr} i_{ds}) - \frac{T_l}{J},$$

$$y = [i_{ds} \quad i_{qs}]^T,$$

where y represents sensed stator current signals, $\omega_1$ is the rotational speed of a reference frame. If $\omega_1=0$, Eqn. (1) is reduced to $$\dot{i}_{ds} = -\gamma i_{ds} + \beta(\alpha\Phi_{dr} + \omega\Phi_{qr}) + \frac{u_{ds}}{\sigma} \quad (2)$$

$$\dot{i}_{qs} = -\gamma i_{qs} + \beta(\alpha\Phi_{qr} + \omega\Phi_{dr}) + \frac{u_{qs}}{\sigma}$$

$$\dot{\Phi}_{dr} = -\alpha\Phi_{dr} - \omega\Phi_{qr} + \alpha L_m i_{ds},$$

Figure 2A:
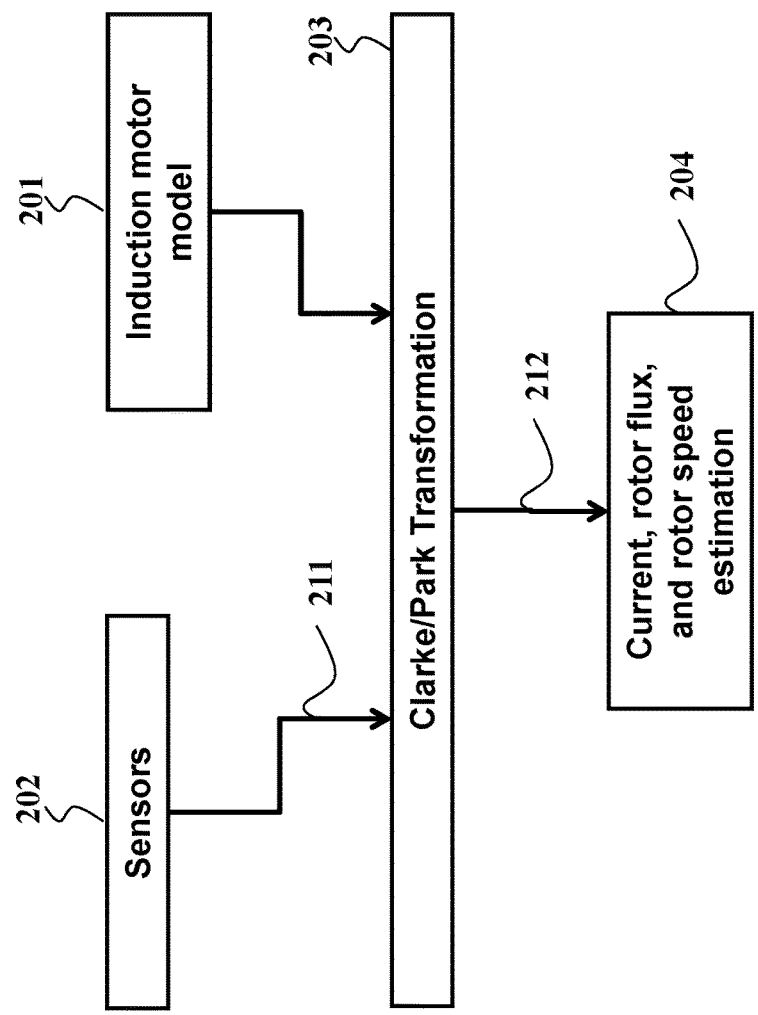
FIGS. 2A and 2B are block diagram of prior art estimator methods based on stator currents and voltages signals.
Figure 2B:
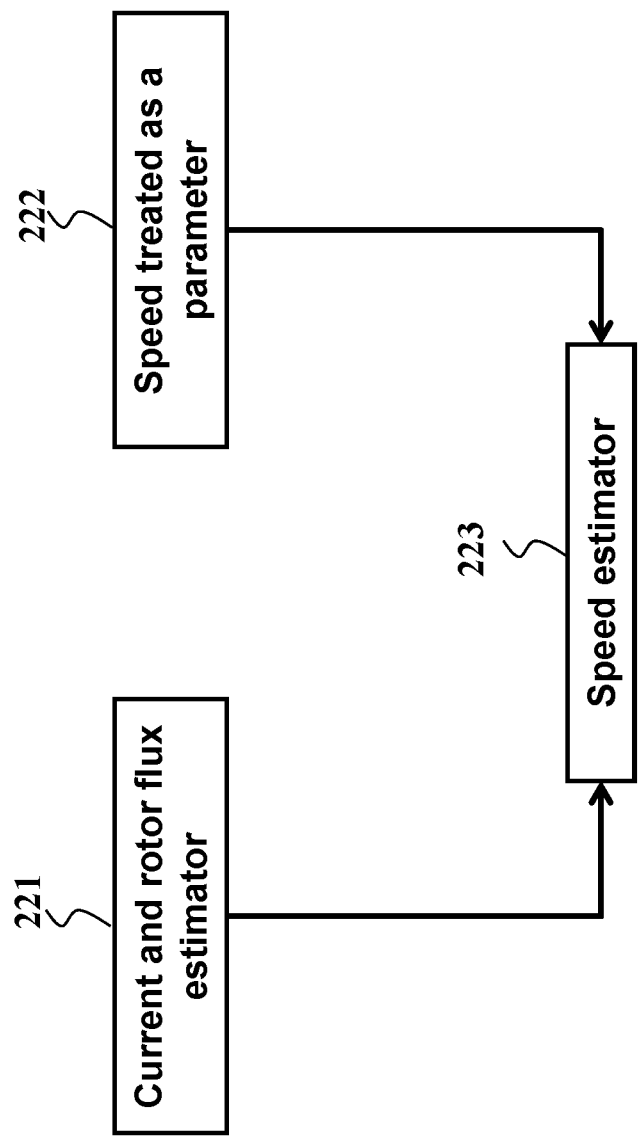

-continued $$\dot{\Phi}_{qr} = -\alpha\Phi_{qr} + \omega\Phi_{dr} + \alpha L_m i_{qs},$$

$$\dot{\omega} = \mu(\Phi_{dr}i_{qs} - \Phi_{qr}i_{ds}) - \frac{T_l}{J},$$

$$y = [\,i_{ds}\ \ i_{qs}\,]^T,$$

which represents the induction motor model without applying the Park transformation, and corresponds to block 201 in FIG. 2A. State of art estimator designs are usually based on the models in Eqns. (1) or (2), which have the same state coordinates denoted by $(i_{ds},i_{qs},\Phi_{dr},\Phi_{qr},\omega)^T$. A direct application of existing estimator design methodologies, e.g., sliding mode observer, high gain observer, Luenberger observer, etc., to the models (1) or (2) does not produce a good estimation of induction motor state including stator currents, rotor flux, and rotor speed, due to coupled nonlinear terms in differential equations. For example, the term $\omega_{qr}$ in the right hand side of the differential equation defining $\dot{i}_{ds}$ is nonlinear, i.e., $$\dot{i}_{ds} = -\gamma i_{ds} + \beta(\alpha\Phi_{dr} + \omega\Phi_{qr}) + \frac{u_{ds}}{\sigma}.$$

Generally, the system in Eqn. (1) cannot be used to design convergence-guaranteed nonlinear observers. In order to design observers giving provably convergent estimation error dynamics, it is beneficial to transform the system (1) into certain structures by a change of coordinates, for simplicity in this invention, a change of state coordinates.

The invention uses the following method and system for state estimation based on a transformed induction motor model obtained by applying a change of state coordinates to the induction motor model (1) or (2).

Figure 3A:
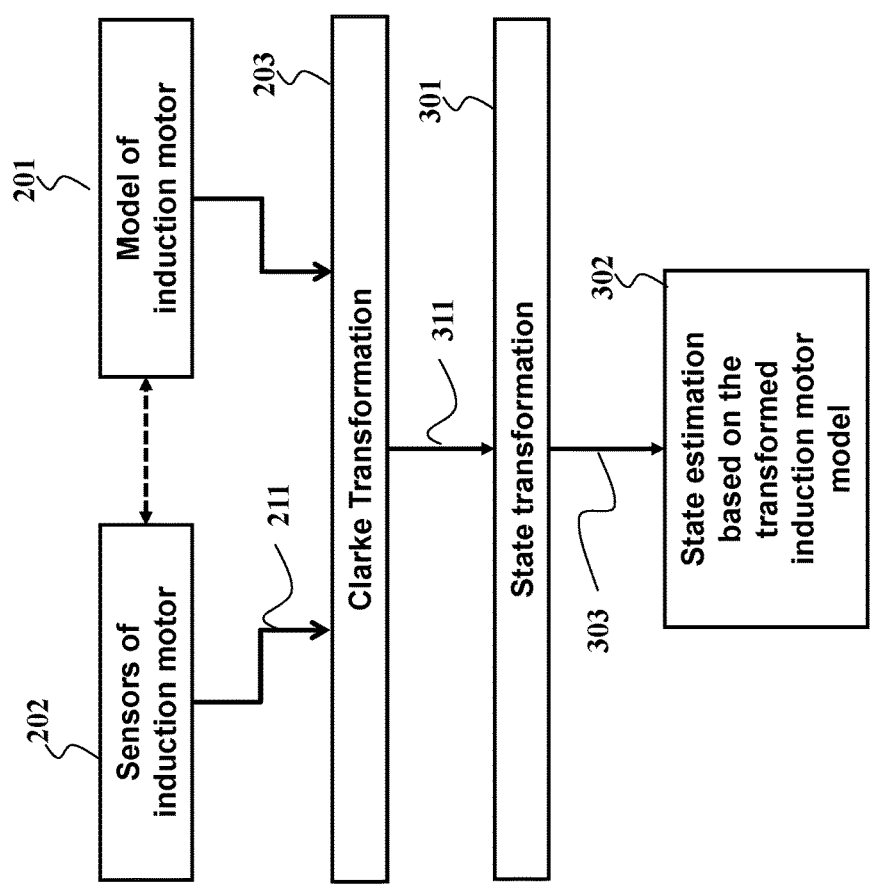
FIG. 3A is a block diagram of a method for estimating a state of an induction motor according to embodiments of the invention.

As shown in FIG. 3A, a state transformation 301, which defines a different set of state coordinates and facilities systematic estimator design, is used in the estimator design flow. The state transformation 301 can be performed on the induction models (1) or (2), e.g., a Park transformation can be used. Applying the state transformation to the induction motor model 201 and sensed stator currents and voltages signals 211 from the sensors 202 produces a transformed induction motor model 303. The transformed induction motor model can then be used to design the state estimator performing the state estimation 302.

Figure 3B:
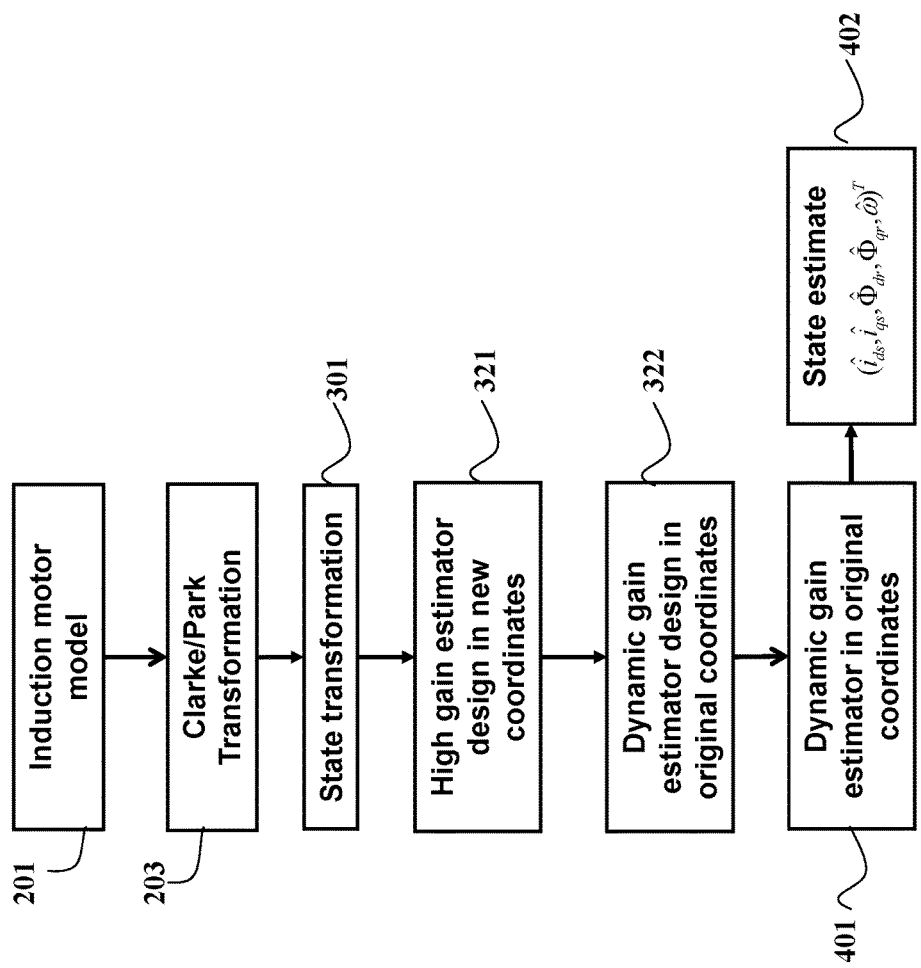
FIG. 3B is a block diagram of additional details of the estimation method according to the embodiments of the invention.

FIG. 3B shows additional details of the estimation using the induction motor model 201 and Clarke/Park transformation 203 to obtain the state transformation 301. Given the transformed induction motor model 303, a high gain estimator design in the new coordinates, defined by the state transformation, is performed in block 321. Then, a dynamic high gain estimator design based on the induction motor model 201, in the original coordinates, is performed in block 322.

Figure 4:
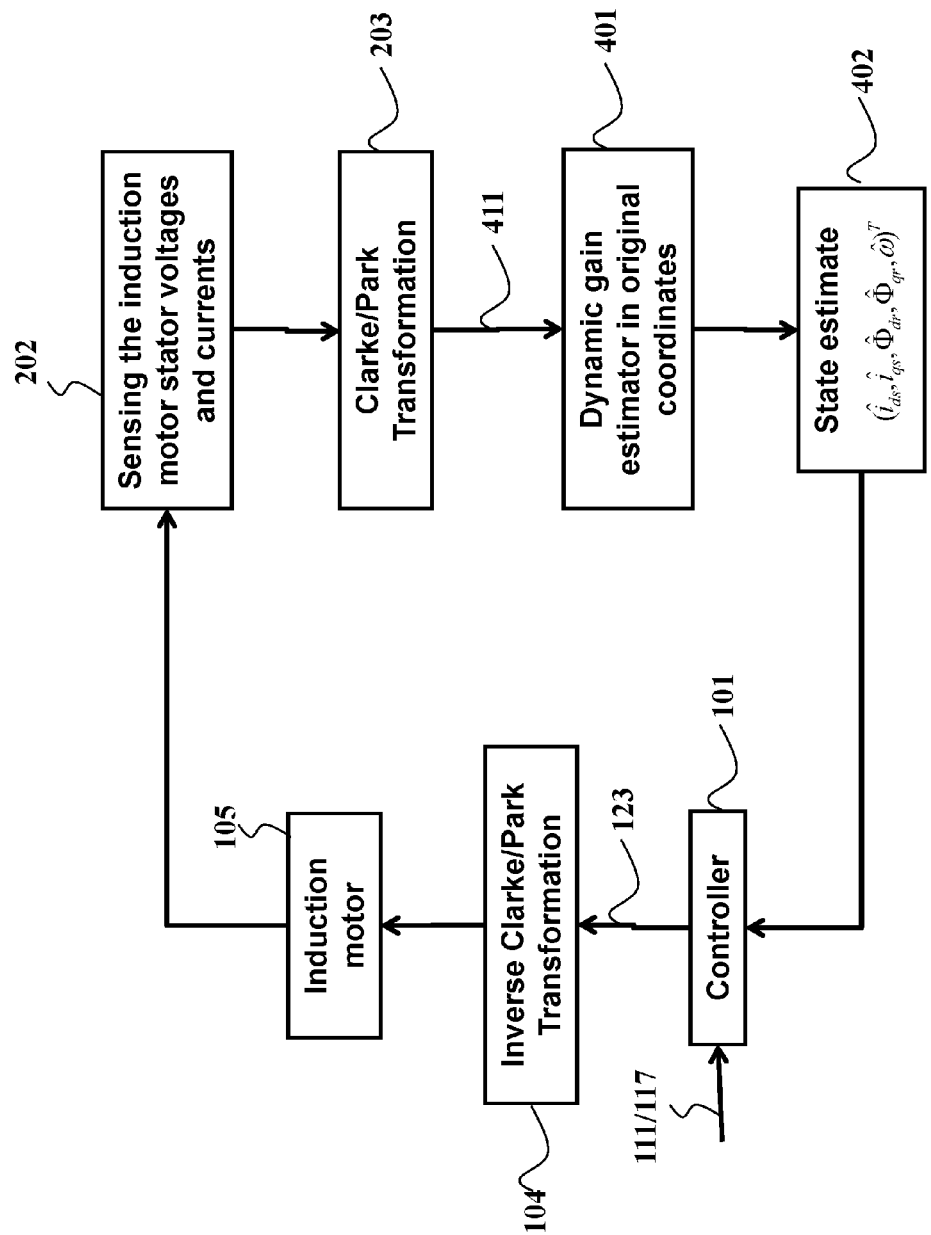
FIG. 4 is a block diagram of a speed sensorless motor drive using the estimation method to obtain a state estimate for a controller according to embodiments of the invention.

The block 322 outputs a high gain estimator 401 in the original state coordinates, which can be implemented in processor to produce estimates 402 of induction motor states including the stator currents, the rotor fluxes, and the rotor speed, also see FIG. 4.

FIG. 4 shows a method for obtaining the state estimate 402 for the controller 101 using the high gain estimator in the original coordinates as 401 so that the speed sensorless motor drives can be realized. During operation of the motor, the block 202 senses the induction motor stator voltages and currents in three-phases. Block 203 transforms the three-phase voltages and currents into space vector signals 411 representing stator currents and rotor fluxes in d and q axes.

The dynamic gain estimator in the original coordinates 401 produces state estimates $(\hat{i}_{ds},\hat{i}_{qs},\hat{\Phi}_{dr},\hat{\Phi}_{qr},\hat{\omega})^T$ 402 for the controller 101, which in turn determines command voltages 123 in two-axis space for the motor. The command voltages 123 are transformed into command voltages in three-phase to the induction motor using the inverse Clarke/Park transformation 104.

Next described is an embodiment of new coordinates which simplifies state estimation in speed sensorless motor drives.

Non-Triangular Observable Form

A high gain observer design can be carried out when the system (1) is transformed into the following non-triangular observable form by a change of state coordinates $x=\phi(\zeta)$ $$\dot{x}=Ax+\Phi(x,u)$$

$$y=Cx, \tag{3}$$

where the state $x \in \mathbb{R}^n$, and for $1 \leq k \leq p$, $$x = \begin{bmatrix} x^1 \\ \vdots \\ x^p \end{bmatrix} \text{ with } x^k = \begin{bmatrix} x_1^k \\ \vdots \\ x_{\lambda_k}^k \end{bmatrix} \in \mathbb{R}^{\lambda_k}$$

$$A = \text{diag}\{A_1, \ldots, A_p\},$$

$$A_k = \begin{bmatrix} 0 & I_{\lambda_k-1} \\ 0 & 0 \end{bmatrix} \in \mathbb{R}^{\lambda_k \times \lambda_k}$$

$$C = \text{diag}\{C_1, \ldots, C_p\},$$

$$C_k = [\,1\ \ 0\,] \in \mathbb{R}^{\lambda_k},$$

where, $x^k$ denotes the state of the $k^{th}$ subsystem associated with the $k^{th}$ output $y_k$, and $\lambda_k$, $1 \leq k \leq p$ are the dimensions of all subsystems. For $1 \leq k \leq p$, we call $\lambda_k$ subsystem indices, and $\Sigma_{k=1}^p \lambda_k = n$. The vector field $\varphi(x,u)$ is $$\varphi = \begin{bmatrix} \varphi^1 \\ \vdots \\ \varphi^p \end{bmatrix} \text{ with } \varphi^k = \begin{bmatrix} \varphi_1^k \\ \vdots \\ \varphi_{\lambda_k}^k \end{bmatrix} \in \mathbb{R}^{\lambda_k}, \ \ 1 \leq k \leq p.$$

Specifically, $\varphi_i^k$ has the following structure: for $1 \leq i \leq \lambda_k - 1$, $$\varphi_i^k = \varphi_i^k(x^1, \ldots, x^{k-1}, x_1^k, \ldots, x_i^k, x_1^{k+1}, \ldots, x_1^p, u) \tag{4}$$

and for $i=\lambda_k$ $$\varphi_i^k = \varphi_{\lambda_k}^k(x^1, \ldots, x^p, u).$$

Motor Drives: Verifying that System (1) Admits the Form (3)

A concise representation of system (1) is $$\dot{\zeta}=f(\zeta)+g^1 u_{ds}+g^2 u_{qs},$$

where $$\zeta=(i_{ds},i_{qs},\Phi_{dr},\Phi_{qr},\omega)^T,$$

$$g^1=(1/\sigma,0,0,0,0)^T,$$

$$g^2=(0,1/\sigma,0,0,0)^T, \text{ and}$$

f, $g^1$, $g^2$ are appropriately defined according to (1).

System (1) is transformable to the non-triangular observable form by the following change of state coordinates, for the $k^{th}$ subsystem $$x^k = \phi^k(\zeta) = \begin{bmatrix} h_k(\zeta) \\ \vdots \\ L_f^{\lambda_k-1} h_k(\zeta) \end{bmatrix}, \quad (5)$$

where $\lambda_k$ are observability indices. Observability ensures that $$x = \phi(\zeta) = ((\phi^1(\zeta))^T, \ldots, (\phi^p(\zeta))^T)^T$$

defines new coordinates, i.e., $\phi(\zeta)$ is a local diffeomorphism.

The observable form is not uniquely defined due to the non-uniqueness of observability definitions and observability indices.

In one embodiment, for system (1) with outputs $h_1 = i_{ds}$ and $h_2 = i_{qs}$, observability indices can be taken as (3, 2). For example, we take $(\lambda_1, \lambda_2) = (3, 2)$ and verify that new state coordinates, given by $$x = (h_1, L_f h_1, L_f^2 h_1, h_2, L_f h_2)^T \quad (6)$$

transforms (1) into the non-triangular observable form (3). For a smooth vector field $f(\zeta): \mathbb{R}^n \to \mathbb{R}^n$ and a smooth function $h(\zeta)$, we denote $$L_f h = \frac{\partial h}{\partial \zeta} f(\zeta)$$

the Lie derivative of $h(\zeta)$ along $f(\zeta)$. Repeated Lie derivative are defined as $$L_f^k h = \frac{\partial (L_f^{k-1} h)}{\partial \zeta} f(\zeta)$$

with $k > 1$.

Given Eqn. (6), the system in x-coordinates is $$\dot{x} = Ax + \varphi(x, u)$$

$$y = Cx,$$

where $A = \text{diag}\{A_1, A_2\}$ with $A_1 \in \mathbb{R}^{3 \times 3}$ and $A_2 \in \mathbb{R}^{2 \times 2}$, $C = \text{diag}\{C_1, C_2\}$ with $C_1 \in \mathbb{R}^3$ and $C_2 \in \mathbb{R}^2$. One can verify that $\varphi$ satisfies the triangular condition in Eqn. (4).

In another embodiment, for system (1) with outputs $h_1 = i_{qs}$ and $h_2 = i_{ds}$, observability indices can be taken as $(\lambda_1, \lambda_2) = (3, 2)$, and we can verify that new state coordinates $x = (h_1, L_f h_1, L_f^2 h_1, h_2, L_f h_2)^T$ transforms (1) into the non-triangular observable form (3).

High Gain Estimator Design in New Coordinates x

For the case when the inverse of the state transformation $\zeta = \phi^{-1}(x)$ is unsolvable, the high gain estimator design in new coordinates $x = \phi(\zeta)$ is not trivial.

Figure 5:
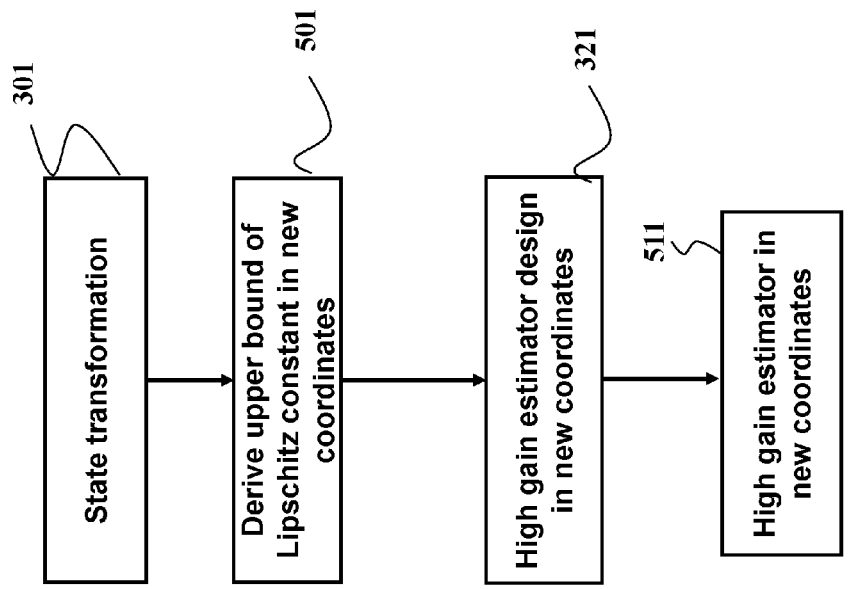
FIG. 5 is a block diagram of a method for obtaining a high gain estimator in new state coordinates for the induction motor according to embodiments of the invention.

FIG. 5 shows that this requires a block 501 to derive an estimate of a strict upper bound of the Lipschitz constant $\varphi(x, u)$ in the new coordinates, whose expression is unknown. Then, the high gain estimator design 321 in the new coordinates can be used to obtain the high gain estimator design 511.

Case When $\zeta = \phi^{-1}(x)$ is Solvable

Given the state transformation $x = \phi(\zeta)$ and its inverse $\zeta = \phi^{-1}(x)$, one can obtain the system representation in the non-triangular observable form. Observer design is performed in the non-triangular observable coordinates to estimate x. Afterwards, estimates of $\zeta$, denoted by $\hat{\zeta}$, is reconstructed out of $\hat{x}$. For the $k^{th}$ subsystem, we use the following observer $$\dot{\hat{x}}^k = A_k \hat{x}^k + \hat{\varphi}^k + \theta^{\delta_k} \Delta_k^{-1}(\theta) S_k^{-1} C_k^T C_k \tilde{x}^k \quad (7)$$

$$\hat{y}_k = C_k \hat{x}^k$$

where $$\hat{x}^k = (\hat{x}_1^k, \ldots, \hat{x}_{\lambda_k}^k)^T, \quad \tilde{x}^k = x^k - \hat{x}^k,$$

$$\theta > 0$$

$$\delta_k = \begin{cases} 2^{p-k} \left( \prod_{i=k+1}^{p} \left( \lambda_i - \frac{3}{2} \right) \right), & \text{if } 1 \leq k \leq p-1 \\ 1, & \text{if } k = p \end{cases}$$

$$\Delta_k(\theta) = \text{diag}\left\{ 1, \frac{1}{\theta^{\delta_k}}, \ldots, \frac{1}{\theta^{\delta_k(\lambda_k-1)}} \right\}$$

$$\hat{\varphi}^k = (\hat{\varphi}_1^k, \ldots, \hat{\varphi}_{\lambda_k}^k)^T$$

$$\hat{\varphi}_i^k = \varphi_i^k(\hat{x}^1, \ldots, \hat{x}^{k-1}, \hat{x}_1^k, \ldots, \hat{x}_i^k, \hat{x}_1^{k+1}, \ldots, \hat{x}_1^p, u)$$

and $S_k$ is solved from $$S_k + A_k^T S_k + S_k A_k = C_k^T C_k. \quad (8)$$

Note that $\theta$ depends on the Lipschitz constant $\omega$.

Case When $\zeta = \phi^{-1}(x)$ is Unsolvable

Without the closed form expression of the inverse state transformation $(= \phi^{-1}(x))$, one cannot obtain the system representation in the non-triangular observable form because the Lipschitz constant $\varphi(x, u)$ is unknown. This poses significant challenges to observer design approaches with state transformation involved because the observer (7) cannot be designed or implemented without knowing the expression of the Lipschitz constant $\varphi(x, u)$. This section describes that one can still perform observer design in the non-triangular observable coordinates.

We describe how to derive the upper bound of the Lipschitz constant of $\varphi$. The design of observer (7) necessitates the expression of $\varphi(x, u)$ in order to estimate the Lipschitz constant of $\varphi(x, u)$ in x. We show how the Lipschitz constant of $\varphi(x, u)$ in x can be estimated on the basis of $\phi(\zeta)$. Assume that $\varphi(x, u)$ is globally Lipschitz with respect to x uniformly in u, i.e., $\forall x_1, x_2 \in \mathbb{R}^n, \exists L_x > 0$ $$|\varphi(x_1, u) - \varphi(x_2, u)| \leq L_x |x_1 - x_2|. \quad (9)$$

Note that $L_x$ is unknown and to be estimated. From Eqn. (9), and considering that $\varphi(x, u)$ is smooth about its arguments, we have for all $u \in \mathbb{R}^m$ $$|\varphi(x_1, u) - \varphi(x_2, u)| \leq \left| \frac{\partial \varphi(x, u)}{\partial x} \right|_\infty \times |x_1 - x_2| \leq$$

$$\left| \frac{\partial \varphi(\phi(\zeta), u)}{\partial \zeta} \frac{\partial \zeta}{\partial x} \right|_\infty \times |x_1 - x_2| \leq \left| \frac{\partial \varphi(\phi(\zeta), u)}{\partial \zeta} \right|_\infty \times \left| \frac{\partial \zeta}{\partial x} \right|_\infty \times |x_1 - x_2| \leq$$

$$\kappa_1 \left| \frac{\partial \zeta}{\partial x} \right|_\infty \times |x_1 - x_2|, \quad \forall x, \zeta \in \mathbb{R}^n,$$

where $$0 < \left| \frac{\partial \varphi(\phi(\zeta), u)}{\partial \zeta} \right|_\infty \leq \kappa_1,$$

and $$\varphi(\phi(\zeta), u) = \frac{\partial \phi(\zeta)}{\partial \zeta}(f(\zeta) + g(\zeta)u) - A\phi(\zeta).$$

Because $$\frac{\partial \varphi(\phi(\zeta), u)}{\partial \zeta}$$

is known, the upper bound of its infinity norm $\kappa_1$ can be established. To derive the upper bound of $$\left|\frac{\partial \zeta}{\partial x}\right|_\infty,$$

we take into account the fact that for a non-singular matrix M, its infinity norm (maximum absolute eigenvalue) is equal to the inverse of the minimum absolute eigenvalue of $M^{-1}$, $$\max|eig(M)| = |M|_\infty = \frac{1}{\min|eig(M^{-1})|}.$$

The above equation produces an upper bound of $$\left|\frac{\partial \zeta}{\partial x}\right|_\infty$$

as $$\kappa_2 = 1/\min\left|eig\left(\frac{\partial x}{\partial \zeta}\right)\right|.$$

Therefore, we establish $\kappa_1\kappa_2$ as the upper bound of the Lipschitz constant $L_x$.

Motor Drives: High Gain Estimator Design in New Coordinates

Given the observer (7) for the $k^{th}$ subsystem and an estimated upper bound of the Lipschitz constant $\varphi(x,u)$, an observer can be designed for each subsystem. For the induction motor case, we take $\lambda_1=3$, $\lambda_2=2$, p=2, and have design parameters $$\theta > 0, \delta_1 = 1, \delta_2 = 1$$

$$\Delta_1(\theta) = \text{diag}\left\{1, \frac{1}{\theta}, \frac{1}{\theta^2}\right\}, \Delta_1(\theta) = \text{diag}\left\{1, \frac{1}{\theta}\right\}$$

$$S_1^{-1}C_1^T = (3, 3, 1)^T, S_2^{-1}C_2^T = (2, 1)^T.$$

Note that $\theta$ is a tuning parameter of the observer. Substituting the above design parameters into the $k^{th}$ subsystem for k={1, 2}, we can obtain observer in x-coordinates as follows $$\dot{\hat{x}}^1 = A_1\hat{x}^1 + {}^1 + G_1C_1\tilde{x}^1$$

$$\dot{\hat{x}}^2 = A_2\hat{x}^2 + {}^2 + G_2C_2\tilde{x}^2,$$

$$\hat{y}_1 = C_1\hat{x}^1$$

$$\hat{y}_2 = C_2\hat{x}^2, \qquad (10)$$

where $$G_1 = \theta^{\delta_1}\Delta_1^{-1}(\theta)S_1^{-1}C_1^T = [3\theta 3\theta^2 \theta^3]^T$$

$$G_2 = \theta^{\delta_2}\Delta_2^{-1}(\theta)S_2^{-1}C_2^T = [2\theta \theta^2]^T.$$

In practice, a less rigorous approach to design the high gain observer in new coordinates can select a sufficiently large $\theta$, which balances performance and sensitivity to noises.

Dynamic Gain Estimator Design in Original Coordinates

One can estimate the state x using the observer designed in x-coordinates. In practice, it is more natural to have the original state estimate $\hat{\zeta}$. For many cases, given the estimator in new coordinates, it is not easy to derive the corresponding estimator in the original coordinates.

Figure 6A:
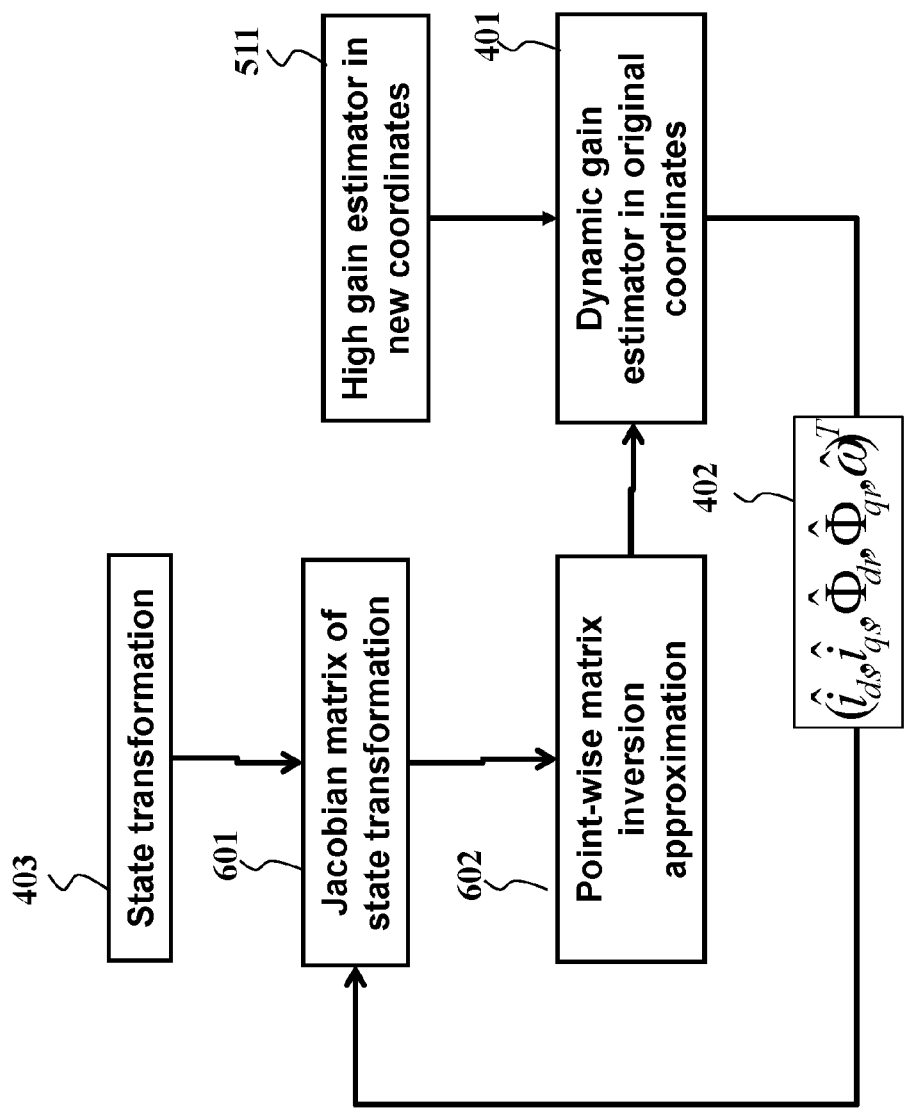
FIGS. 6A and 6B are block diagrams of methods for deriving a dynamic gain estimator in original coordinates based on the estimator design in the new coordinates according to embodiments of the invention.
Figure 6B:
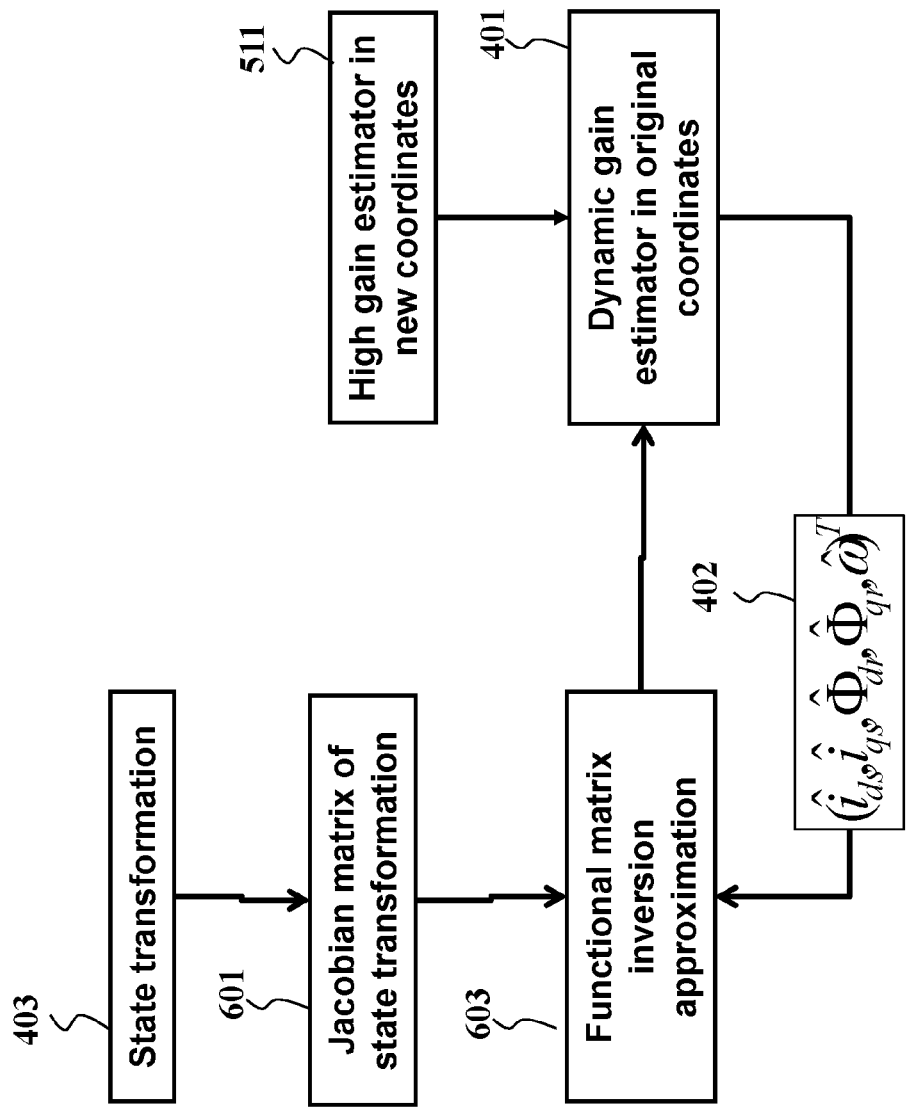

FIGS. 6A and 6B show two methods useful for deriving an implementable dynamic gain estimator in the original coordinates based on the estimator design in the new coordinates. FIGS. 6A and 6B mainly addresses the issues during dynamic gain estimator design when $\zeta=\phi^{-1}(x)$ is unsolvable.

FIG. 6A shows the method using a point-wise matrix inversion approximation 602, and FIG. 6B shows the method using a functional matrix inversion approximation 603. Block 601 determines a Jacobian matrix of the state transformation in closed form.

As shown in FIG. 6A, block 601 determines a Jacobian matrix of the state transformation in closed form, $$Q_o(\zeta) = \frac{\partial x}{\partial \zeta},$$

and then takes the output (estimated state in the original coordinates) of the dynamic gain estimator 401, finally evaluate the numerical value of the Jacobian matrix point-wisely at the estimated state, i.e., $$Q_o(\zeta)|_{\zeta=\hat{\zeta}} = Q_o(\hat{\zeta})$$

with $\hat{\zeta}=(\hat{i}_{ds},\hat{i}_{qs},\hat{\Phi}_{qr},\hat{\Phi}_{qr},\hat{\omega})$. We therefore have a point-wise matrix $Q_o(\hat{\zeta})$.

It is likely the matrix $Q_o(\hat{\zeta})$ is singular or close to singular, i.e., ill-conditionedness. Both facts lead to divergence of state estimation. Block 602 addresses the issues raising from the ill-conditionedness of $Q_o(\hat{\zeta})$, and determines an approximate inverse of the point-wise matrix $Q_o(\hat{\zeta})$ by replacing the ill-conditioned matrix $Q_o(\hat{\zeta})$ with its non-singular and well-conditioned approximation. The dynamic gain estimator 401 is implemented based on the high gain estimator in the new coordinates and the approximate inverse of the point-wise matrix $Q_o(\hat{\zeta})$.

FIG. 6B shows an alternative implementation of the dynamic gain estimator 401. The output of the Jacobian matrix of state transformation 601 is a matrix $Q_o$, where each element is a function of $\zeta$. Instead of evaluating the numerical value of $Q_o$ at $\zeta=\hat{\zeta}$. Block 603 first tries to approximate the function matrix $Q_o$ by an approximate function matrix $\hat{Q}_o(\zeta)$ then evaluates the numerical value of the approximate function matrix $\hat{Q}_o$ at $\zeta=\hat{\zeta}$ point-wisely, and determine the inverse of $\hat{Q}_o(\hat{\zeta})$ point-wisely, which is further used by block 401 to implement a dynamic gain estimator.

Case When $\zeta=\phi^{-1}(x)$ is Solvable

Two approaches can be used to construct $\hat{\zeta}$. The first solves for $\hat{\zeta}$ from $\hat{x}$ based on the closed form expression of the inverse transformation $\zeta=\phi^{-1}(x)$. That is $\hat{\zeta}=\phi^{-1}(\hat{x})$. The second implements the observer (7) in $\zeta$-coordinates as follows $$\dot{\hat{\zeta}} = f(\hat{\zeta}) + g(\hat{\zeta}, u) + \frac{\partial \zeta}{\partial x} \Theta \Delta^{-1}(\theta) S^{-1} C^T (y - \hat{y}),$$ (11)

$$\hat{y} = h(\hat{\zeta}),$$

where $$\Theta = \text{diag}\{\theta^{\delta_1}, \ldots, \theta^{\delta_p}\}$$

$$\Delta^{-1} = \text{diag}\{\Delta_1^{-1}(\theta), \ldots, \Delta_p^{-1}(\theta)\}$$

$$S^{-1} = \text{diag}\{S_1^{-1}, \ldots, S_p^{-1}\}.$$

Notice that Eqn. (11) includes the term $$\frac{\partial \zeta}{\partial x},$$

which assumes the closed form formula of the inverse transformation $\zeta=\phi^{-1}(x)$, and thus may not be implementable with an explicit expression of $\zeta=\phi^{-1}(x)$.

Case When $\zeta=\phi^{-1}(x)$ is Unsolvable

With the expression of $\varphi(x,u)$ unknown, the observer (7) cannot be realized unless $\varphi$ is represented as a function of $\phi(\zeta),u)$. Consequently, the following implementable x-observer can be obtained $$\dot{\hat{x}}^k = A_k \hat{x}^k + \varphi^k(\phi(\hat{\zeta}),u) + \theta^{\delta_k} \Delta_k^{-1}(\theta) S_k^{-1} C_k^T C_k \tilde{x}^k,$$

$$\hat{y} = C_k \hat{x}^k,$$ (12)

where $\varphi^k(\phi(\hat{\zeta}),u)$ are the rows corresponding to the $k^{th}$ subsystem in $\varphi(\phi(\hat{\zeta}),u)$ given by $$\varphi(\phi(\hat{\zeta}), u) = \frac{\partial \phi(\hat{\zeta})}{\partial \hat{\zeta}} (f(\hat{\zeta}) + g(\hat{\zeta})u) - A\phi(\hat{\zeta})$$

and $\hat{\zeta}$ is numerically solved from the following n nonlinear algebraic equations $$\hat{x} = \varphi(\hat{\zeta}).$$ (13)

As a result, the observer (12) is implemented as (13) and $$\dot{\hat{x}} = \frac{\partial \phi(\hat{\zeta}, u)}{\partial \hat{\zeta}} (f(\hat{\zeta}) + g(\hat{\zeta})u) + \Theta \Delta^{-1}(\theta) S^{-1} C^T C \tilde{x},$$ (14)

$$\hat{y} = C\hat{x}.$$

Alternatively, considering the state transformation $\phi(\zeta)$ is a local diffeomorphism, and thus its Jacobian $$\frac{\partial x}{\partial \zeta}$$

is non-singular. One can therefore implement the observer (11) as follows $$\dot{\hat{\zeta}} = f(\hat{\zeta}) + g(\hat{\zeta}, u) + \left(\frac{\partial x}{\partial \hat{\zeta}}\right)^{-1} \Theta \Delta^{-1}(\theta) S^{-1} C^T (y - \hat{y}),$$ (15)

$$\hat{y} = h(\hat{\zeta}).$$

Note that Eqn. (15) is different from Eqn. (11) where the Jacobian of the inverse state transformation $$\frac{\partial \zeta}{\partial x}$$

is used.

Motor Drives: High Gain Estimator Design in Original Coordinates

Two approaches can be used to estimate $\zeta$ on the basis of Eqn. (10). The estimated state $\hat{\zeta}$ can be constructed by implementing the observer in $\zeta$-coordinates, i.e., as in Eqn. (15).

Point-Wise Matrix Inverse Approximation

To shorten the notation, we use $$Q_o = \frac{\partial \hat{x}}{\partial \hat{\zeta}}.$$

Implementation of the observer in Eqn. (15) requires one to solve the inverse of $Q_o$ in realtime, more accurately, to solve the observer gain $G_\zeta$ in $\zeta$-coordinates from the following linear system $$G_x = Q_o G_\zeta,$$ (16)

where $G_x = \Theta \Delta^{-1}(\theta) S^{-1} C^T$. Numerical instability could be serious when $Q_o$ is ill-conditioned, and we cannot easily rely on the solutions coming out of an ill-conditioned $Q_o$, for instance the least square solution $$G_\zeta = (Q_o^T Q_o)^{-1} Q_o^T G_x$$

becomes useless. Let $\text{cond}(Q_o) = |Q_o|_{28} |Q_o^{-1}|_\infty$ be the condition number of $Q_o$. One can expect a loss of roughly $\log_{10}(\text{cond}(Q_o))$ decimal places in the accuracy of the solutions.

Next, we describe techniques to remedy the aforementioned numerical instability.

Figure 7A:
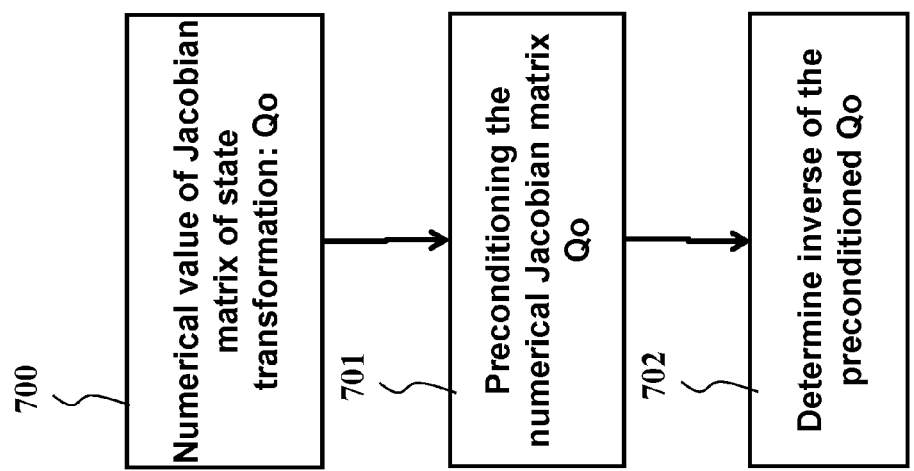
FIGS. 7A and 7B are block diagrams of point-wise matrix inverse approximations according to embodiments of the invention.
Figure 7B:
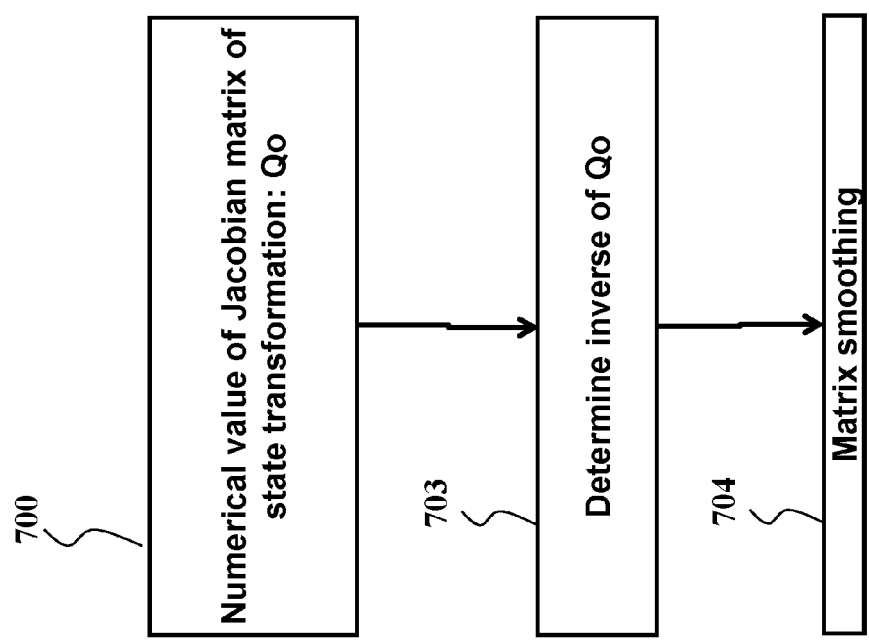

FIGS. 7A and 7B show embodiments of point-wise matrix inverse approximation 602. In both cases, the input 700 is the numeral value of Jacobian matrix of the state transformation $Q_o$ 700. As shown in FIG. 7A, the point-wise numerical matrix $Q_o(\hat{\zeta})$ is preconditioned by several techniques as below to produce a pre-conditioned $\bar{Q}_o(\hat{\zeta})$ 701, and then determine 702 the inverse of the preconditioned matrix 701.

Preconditioning

A number of method are known for obtaining a good approximate inverse of an ill-conditioned $Q_o$ using techniques such as pre-conditioning, scaling, etc. An intuitive pre-conditioning, also called the Tikhonov regularization, uses a positive constant h into (16) and tries to solve $$G_\zeta = (Q_o^T Q_o + hI)^{-1} Q_o^T G_x.$$

By using h, the Tikhonov regularization reduces the condition number of $Q_o^T Q_o$ and results in an improvement of the solution accuracy. Alternatively, one can regularize the problem by adding extra information, for instance the smoothness of $G_\zeta$. The basic idea is that the correct solution among all "near" solutions is characterized by requiring a "smoothness" of some function, curve or surface constructed from $G_\zeta$ at a fixed time instant.

Dynamic Gain

When a smooth function of $\zeta(t)$ is continuous over time, $G_\zeta$ is continuous over time as well. However, this contradicts the fact that an ill-conditioned $Q_o$ typically results in discontinuity of $G_\zeta$ over time. Therefore, during implementation, one can force that $G_\zeta$ is be continuous over time.

As shown in FIG. 7B, the inverse of the point-wise numerical matrix $Q_o(\hat{\zeta})$ is first determined in 703, and then the the inverse matrix is fed into a matrix smoothing block 704 to smooth the matrix, such that effects of instantaneous ill-conditionedness of $Q_o(\hat{\zeta})$ are attenuated by previous values.

One embodiment of the matrix smoothing mechanism can be $$G_\zeta(k) = \begin{cases} \text{solved from (16),} & \text{if } cond(Q_o) \le c \\ G_\zeta(k-1), & \text{otherwise} \end{cases},$$

where k is the time step, and c is a positive constant. Another embodiment of the matrix smoothing mechanism uses a low pass filter.

Functional Matrix Inverse Approximation $Q_o$

The above described preconditioning methods concentrate on Eqn. (16), and try to resolve the ill-conditionedness of the numerical matrix $Q_o$ at a fixed time instant (point-wisely). As shown in FIG. 6B, one can also take an approach from a systematic perspective, where $Q_o$ is treated as a function of $\zeta$ instead. The idea is to replace $Q_o$ in Eqn. (16) with an approximate matrix $\hat{Q}_o$. Both $Q_o$ and $\hat{Q}_o$ are functions of $\zeta$. Block 603 solve the problem finding $\hat{Q}_o$ that can be explicitly written as follows, for all $\zeta$, $$\min_{\hat{Q}_o(\zeta) \in Q} |Q_o(\zeta) - \hat{Q}_o(\zeta)| \quad (17)$$

subject to $cond(\hat{Q}_o(\zeta)) < c$, where Q is a functional space, and $|Q_o - \hat{Q}_o|$ is certain norm representing the distance between $Q_o$ and $\hat{Q}_o$. The problem in Eqn. (17) is of infinite dimensions and very difficult to solve. Instead, approximation of $Q_o$ is more often accomplished intuitively.

Figure 8A:
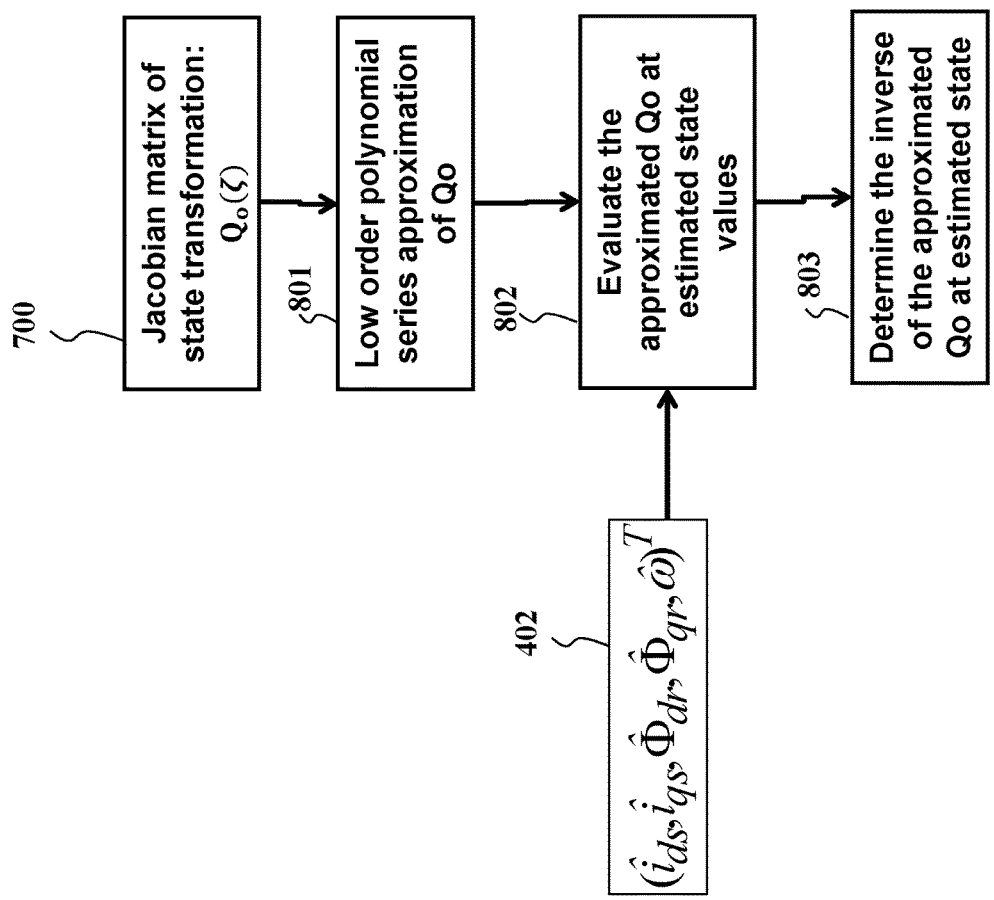
FIGS. 8A and 8B are block diagrams of functional matrix inversion approximations according to embodiments of the invention.
Figure 8B:
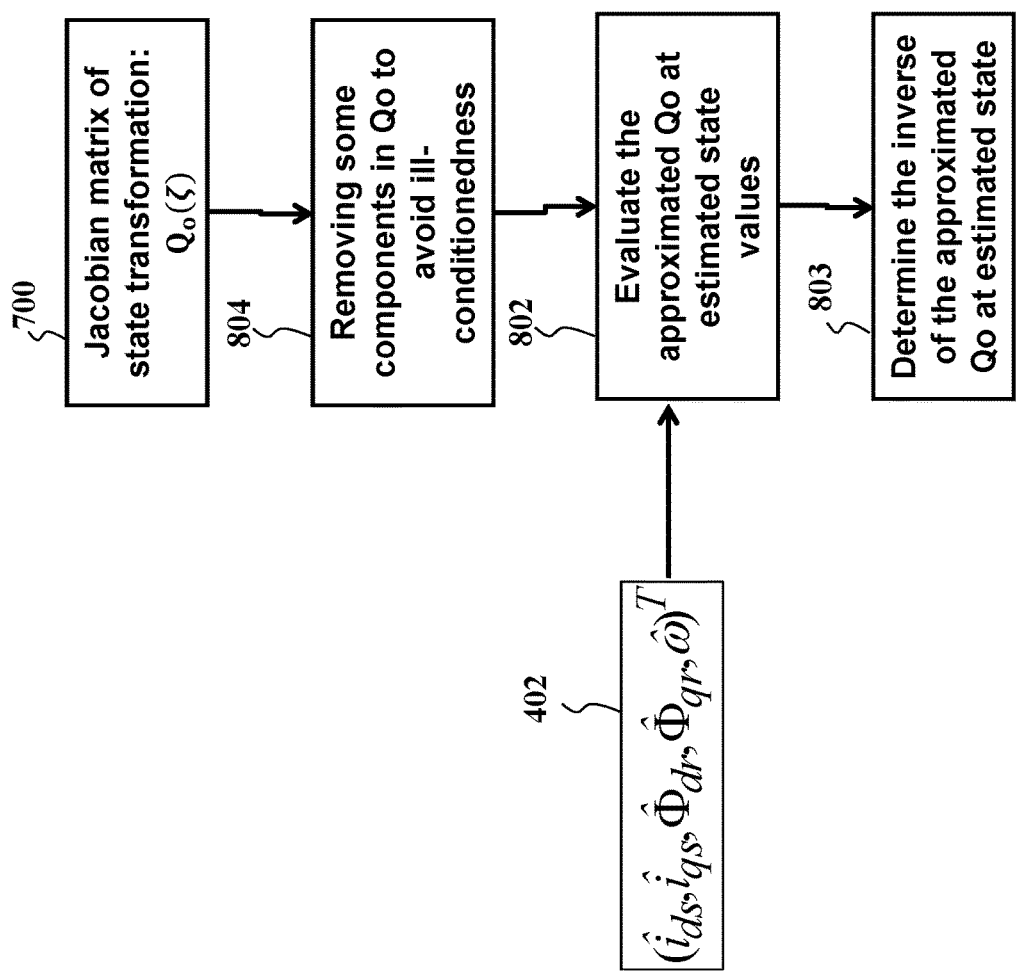

FIGS. 8A and 8B show embodiments of functional matrix inversion approximation 603. As shown in FIG. 8A, the Jacobian matrix $Q_o(\zeta)$ 700, which is a multi-variable smooth function matrix, can be approximated to arbitrary accuracy by Tylor series expansion, which is infinite dimensional and not suitable for implementation. By truncating the Taylor series expansion of $Q_o(\zeta)$ to certain order in, one can obtain a low order polynomial series approximation of $Q_o(\zeta)$ 801, which is not ill-conditioned. Evaluating 802 the value of low order polynomial series approximation at $\zeta = \hat{\zeta}$ 802, and determining 803 its inverse enables the implementation of dynamic gain estimator 401.

FIG. 8B shows another embodiment, which eliminates from $Q_o$ certain components which causes ill-conditionedness of $Q_o(\zeta)$. For the speed sensorless motor drive case, the ill-conditioned matrix $Q_o$ incurs large fluctuations of the speed estimate.

An embodiment of the function approximation idea solves (17) by exploiting the structure of $Q_o$. Notice that in the fixed frame, the matrix $Q_o$ is periodically time-varying, and thus makes the numerical stability issue more complicated.

Hence, we first rewrite the system (1) in a frame rotating at $\omega_1$ so that at a steady state, $i_{ds}, i_{qs}, \Phi_{dr}, \Phi_{qr}$ are constants. Then, we remove 804 some components in Qo to get $\hat{Q}_o$ and avoid ill-conditionednesstrim $Q_o$, which is suitable for real-time implementation and give reasonable state estimation performance. For illustration purpose, we express $$Q_o = \begin{bmatrix} 1 & 0 & 0 & 0 & 0 \\ 0 & \omega_1 & \alpha\beta & \beta\hat{\omega} & \beta\hat{\Phi}_{qr} \\ 0 & 1 & 0 & 0 & 0 \\ -\omega_1 & 0 & -\beta\hat{\omega} & \alpha\beta & -\beta\hat{\Phi}_{dr} \\ * & * & * & * & * \end{bmatrix}.$$

Notice that the elements in the last row of matrix $Q_o$ are large numbers, and cause the ill-conditionedness. Also, the last row uses large feedback gains in the $\tilde{i}_{ds}$ and $\tilde{i}_{ds}$-dynamics, and thus make the entire error dynamics sensitive to measurement noises. Therefore, we approximate matrix $\hat{Q}_o$ by letting the first four elements of the last row in $Q_o$ be zero. We implement the observer (15) with $$\frac{\partial \hat{x}}{\partial \hat{\zeta}},$$

equivalently $Q_o$, replaced by $$\hat{Q}_o = \begin{bmatrix} 1 & 0 & 0 & 0 & 0 \\ 0 & \omega_1 & \alpha\beta & \beta\hat{\omega} & \beta\hat{\Phi}_{qr} \\ 0 & 1 & 0 & 0 & 0 \\ -\omega_1 & 0 & -\beta\hat{\omega} & \alpha\beta & -\beta\hat{\Phi}_{dr} \\ 0 & 0 & 0 & 0 & * \end{bmatrix}.$$

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an angular speed of a rotor of an induction motor without an encoder for rotor position and speed sensing, comprising steps of:
    sensing stator currents and voltages of the induction motor;
    designing a dynamic gain estimator by applying a state transformation to a model of the induction motor;
    estimating a state of the induction motor by applying the dynamic gain estimator to the currents and the voltages, and
    using the state to control the angular speed of the rotor of the induction motor, wherein the designing further comprises:
    applying the state transformation to the model in the original coordinates defined by $(i_{ds}, i_{qs}, \Phi_{dr}, \Phi_{qr}, \omega)^T$ to produce a transformed induction motor model in a non-triangular observable form, wherein $i_{ds}$ represents the current on d-axis, $i_{qs}$, represents the current on q-axis, $\Phi_{dr}$ and $\Phi_{qr}$ respectively represent rotor fluxes on d- and q-axis, ω represents a rotor angular speed, and T is a transpose operator;

determining the high gain estimator in new state coordinates defined by the state transformation, based on the transformed induction motor model; and determining an approximation of an inverse of a Jacobian matrix of the state transformation.

2. The method of claim 1, wherein the model is transformed to the non-triangular observable form by the state transformation with observability indices ($\lambda_1=3$, $\lambda_2=2$)

$$x=(h_1,L_f h_1,L_f^2 h_1,h_2,L_f h_2)^T$$

where $h_1=i_{ds}$, $h_2=i_{qs}$, and $L_f^k h_j$ represents a $k^{th}$ Lie derivative of $h_j$ along a vector field f representing the dynamics of the model, wherein k is an index with values equal to 1 or 2, j is an index with values equal to 1 or 2.

3. The method of claim 1, where the dynamic gain estimator consists of nonlinear differential equations represented in the original state coordinates.

4. The method of claim 2, wherein the designing further comprises:

deriving an upper bound of a Lipschitz constant of a nonlinear vector field φ in the transformed induction motor model;

selecting a tuning parameter θ according to the upper bound; and determining parameters in the high gain estimator according to θ and the state transformation.

5. The method of claim 4, wherein the upper bound is based on determining a maximum eigenvalue of a Jacobian matrix of the state transformation, or selecting a sufficiently large positive number.

6. The method of claim 4, wherein the tuning parameter θ is selected to be a sufficiently large positive number to ensure convergent state estimation.

7. The method of claim 1, where the determination of the approximation of the inverse of the Jacobian matrix of the state transformation comprises:

evaluating the Jacobian matrix at an estimated state; and determining the approximate inverse of the evaluated Jacobian matrix.

8. The method of claim 7, where the determining of the approximation inverse of the Jacobian matrix is based on applying pre-conditioning techniques to obtain a pre-conditioned Jacobian matrix, and the approximate inverse is obtained by determining the inverse of the pre-conditioned Jacobian matrix.

9. The method of claim 7, where the determining of the approximation inverse of the Jacobian matrix is based on first determining an pseudo-inverse of the Jacobian matrix, and then smoothing the pseudo-inverse with a low pass filter.

10. The method of claim 1, where the determination of the approximation of the inverse of the Jacobian matrix of the state transformation comprises:

determining an approximate function matrix of the Jacobian matrix;

evaluating the approximate function matrix at an estimated state; and determining the approximate inverse of the evaluated Jacobian matrix by inverting the approximated function matrix.

11. The method of claim 10, where the determination of the approximate function matrix comprises:

representing the Jacobian matrix as a polynomial series expansion; and determining a low order polynomial series approximation of the Jacobian matrix by truncating high order terms in the polynomial series expansion.

12. The method of claim 10, where the determination of the approximate function matrix comprises:

performing structural analysis of the Jacobian matrix to identify elements making the Jacobian matrix ill-conditioned; and obtaining an approximate Jacobian matrix by removing the elements.

13. The method of claim 1, wherein the designing further comprises:

choosing the high gain estimator in new state coordinates and a set of nonlinear algebraic equations derived from the state transformation as the dynamic gain estimator.

14. The method of claim 13, wherein the dynamic gain estimator consists of another set of nonlinear differential equations representing the high gain estimator in the new state coordinates, and a set of nonlinear algebraic equations defined by the state transformation.

15. The method of claim 14, where the dynamic gain estimator produces an estimated state by numerically and iteratively solving the set of nonlinear algebraic equations.

16. A system for controlling an angular speed of a rotor of an induction motor without an encoder for rotor position and speed sensing, comprising:

a sensor configured to sense stator currents and voltages of the induction motor; and a processor configured to design a dynamic gain estimator by applying a state transformation to a model of the induction motor, to estimate a state of the induction motor by applying the dynamic gain estimator to the currents and the voltages, and to use the state to control the angular speed of the rotor of the induction motor, wherein, to design the dynamic gain estimator, the processor is configured to apply the state transformation to the model in the original coordinates defined by $(i_{ds},i_{qs},\Phi_{dr},\Phi_{qr},\omega)^T$ to produce a transformed induction motor model in a non-triangular observable form, wherein $i_{ds}$ represents the current on d-axis, $i_{qs}$, represents the current on q-axis, $\Phi_{dr}$ and $\Phi_{qr}$ respectively represent rotor fluxes on d- and q-axis, ω represents a rotor angular speed, and T is a transpose operator;

determine the high gain estimator in new state coordinates defined by the state transformation, based on the transformed induction motor model; and determine an approximation of an inverse of a Jacobian matrix of the state transformation.

* * * * *